US010671234B2

United States Patent
Conway et al.

(10) Patent No.: US 10,671,234 B2
(45) Date of Patent: Jun. 2, 2020

(54) METHOD AND AN ELECTRONIC DEVICE FOR PERFORMING PLAYBACK OF STREAMED MEDIA INCLUDING RELATED MEDIA CONTENT

(71) Applicant: SPOTIFY AB, Stockholm (SE)

(72) Inventors: Frank Conway, Hoboken, NJ (US); Robert William Wood, New Rochelle, NY (US); Arvind Suresh, Stockholm (SE); Tobias Heinrich Schneider, Brooklyn, NY (US)

(73) Assignee: SPOTIFY AB, Stockholm (SE)

( * ) Notice: Subject to any disclaimer, the term of this patent is extended or adjusted under 35 U.S.C. 154(b) by 232 days.

(21) Appl. No.: 14/749,512

(22) Filed: Jun. 24, 2015

(65) Prior Publication Data
US 2016/0378269 A1    Dec. 29, 2016

(51) Int. Cl.
*G06F 3/0481* (2013.01)
*H04L 29/06* (2006.01)
(Continued)

(52) U.S. Cl.
CPC ............ *G06F 3/0481* (2013.01); *G06F 3/005* (2013.01); *G06F 3/0488* (2013.01);
(Continued)

(58) Field of Classification Search
CPC .......... H04N 2005/44565; H04N 2005/44569; H04N 5/445; H04N 5/44582;
(Continued)

(56) References Cited

U.S. PATENT DOCUMENTS 7,730,405 B2 *  6/2010  Gulli ................... G06F 17/3084
                                              715/718
7,913,157 B1 *  3/2011  Stoakley .............. G11B 27/034
                                              715/201
(Continued)

OTHER PUBLICATIONS

Office Action dated Jul. 18, 2017 issued by United States Patent and Trademark Office on U.S. Appl. No. 14/749,518, 38 pages.
(Continued)

*Primary Examiner* — Ryan F Pitaro
(74) *Attorney, Agent, or Firm* — Tucker Ellis LLP

(57) ABSTRACT

Described herein are methods and electronic devices for performing playback of streamed media, including complementing a media content item with an associated media content item. In accordance with an exemplary embodiment, during playback of a first media content item, a message is sent to a computer server system, to return information that a related second media content item is selectable. The information that the second media content item is selectable is displayed at a user interface as a visual array of tiles, wherein each one of the tiles corresponds to a respective second media content item. Playback of the second media content item can be combined with the first media content item. By displaying information about selectable associated media content items to a user, the user will be enabled to individually select associated media content items to complement a currently playbacked media content item.

21 Claims, 8 Drawing Sheets

(51) Int. Cl.
    *G06F 3/0488* (2013.01)
    *G06F 3/00* (2006.01)
    *G06F 3/0484* (2013.01)

(52) U.S. Cl.
    CPC ...... *G06F 3/04842* (2013.01); *H04L 65/1089* (2013.01); *H04L 65/4023* (2013.01); *H04L 65/4084* (2013.01)

(58) Field of Classification Search
    CPC .............. H04N 5/44591; G06F 3/0481; G06F 3/04842; G06F 3/005; G06F 3/0488; G06F 3/04886; G06F 3/0482; H04L 65/4023; H04L 65/1089; H04L 65/4084
    See application file for complete search history.

(56) References Cited

U.S. PATENT DOCUMENTS

| | | | | |
|---|---|---|---|---|
| 9,336,528 | B2* | 5/2016 | Beaton | G06Q 30/02 |
| 2002/0042920 | A1* | 4/2002 | Thomas | G06F 3/0481 725/87 |
| 2003/0005437 | A1 | 1/2003 | Feuer et al. | |
| 2005/0007965 | A1* | 1/2005 | Hagen | H04L 12/1822 370/260 |
| 2006/0161868 | A1* | 7/2006 | Van Dok | G06F 3/0481 715/835 |
| 2007/0250901 | A1* | 10/2007 | McIntire | H04N 7/17318 725/146 |
| 2008/0052026 | A1 | 2/2008 | Amidon et al. | |
| 2008/0062141 | A1* | 3/2008 | Chandhri | G06F 3/0482 345/173 |
| 2008/0168505 | A1* | 7/2008 | Saito | H04N 7/147 725/61 |
| 2008/0184127 | A1* | 7/2008 | Rafey | G06F 17/30056 715/736 |
| 2008/0190266 | A1* | 8/2008 | Kim | G06F 3/0488 84/602 |
| 2008/0307360 | A1* | 12/2008 | Chaudhri | G06F 9/451 715/835 |
| 2009/0068971 | A1* | 3/2009 | Grigsby | H04H 60/31 455/185.1 |
| 2009/0304359 | A1* | 12/2009 | Lemay | G11B 27/105 386/353 |
| 2011/0211808 | A1* | 9/2011 | Ryu | G11B 27/105 386/234 |
| 2011/0296351 | A1* | 12/2011 | Ewing, Jr. | G06F 3/0346 715/841 |
| 2012/0251082 | A1 | 10/2012 | De Vos et al. | |
| 2012/0278716 | A1* | 11/2012 | Ye | H04N 21/4126 715/717 |
| 2013/0055307 | A1* | 2/2013 | Duan | H04N 21/23424 725/32 |
| 2013/0223538 | A1* | 8/2013 | Wang | H04N 21/4307 375/240.25 |
| 2013/0227471 | A1 | 8/2013 | Cha et al. | |
| 2014/0068440 | A1* | 3/2014 | Wiltzius | G06F 3/0481 715/727 |
| 2014/0095965 | A1* | 4/2014 | Li | G11B 27/10 715/203 |
| 2014/0195918 | A1* | 7/2014 | Friedlander | G06F 3/04842 715/727 |
| 2014/0201631 | A1* | 7/2014 | Pornprasitsakul | G06F 3/0484 715/716 |
| 2015/0205473 | A1* | 7/2015 | Weber | G06F 3/0485 715/830 |
| 2015/0286352 | A1* | 10/2015 | Gu | G06F 3/0482 715/841 |
| 2015/0309668 | A1* | 10/2015 | Sun | G06F 3/0481 715/783 |
| 2016/0192031 | A1* | 6/2016 | Briggs | H04N 21/435 725/32 |
| 2016/0227285 | A1* | 8/2016 | Voss | G06F 3/0482 |
| 2016/0323221 | A1* | 11/2016 | Martell | H04L 51/32 |
| 2016/0337702 | A1* | 11/2016 | Klappert | H04N 21/4722 |
| 2016/0342287 | A1* | 11/2016 | Barker | H04N 21/4316 |
| 2017/0127132 | A1* | 5/2017 | Shekhar | H04N 21/252 |
| 2017/0180772 | A1* | 6/2017 | Wilms | H04N 21/26258 |

OTHER PUBLICATIONS

Notice of Allowance dated Mar. 12, 2018 issued by United States Patent and Trademark Office on U.S. Appl. No. 14/749,518, 18 pages.

* cited by examiner

METHOD AND AN ELECTRONIC DEVICE FOR PERFORMING PLAYBACK OF STREAMED MEDIA INCLUDING RELATED MEDIA CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to the providing of media content. In particular, the embodiments of the present invention relate to methods of operating an electronic device and corresponding electronic devices for playing of media content.

BACKGROUND

As computer technology has improved, the digital media industry has evolved greatly in recent years. Users are able to use electronic devices such as mobile communication devices (e.g., cellular telephones, smart phones, tablet computers, etc.) to consume music, video and other forms of media content. For instance, users can listen to audio content (e.g., music) and/or watch video content (e.g., movies, television (TV) broadcasts, etc.) on a variety of electronic devices.

When performing playback of streamed media, e.g. listing to songs or watching a video, a user may sometimes be interested in acquiring further information related to the current playbacked song or video. For instance, the user or media consumer may want to see the lyrics of a song or know background information of an artist, an album or a film.

Traditionally, music and other audio media have been offered on tapes, records, CDs (Compact Discs), etc, and buyers have received the lyrics together with the audio media, e.g. printed on an inner envelope.

Today, music is sometimes delivered by various streaming services to the consumers who listen to the music on electronic devices. When the consumers do not visit any music shop, he/she will then not be able to get the lyrics of the song together with the song or album which comprises the song.

Thus, there is a need to improve the user experience when delivering songs and other media content, e.g. through streaming services.

SUMMARY

It is in view of the above considerations and others that the various embodiments disclosed herein have been made.

It is a general object of the embodiments described herein to allow for an improved way of personalizing playback of media content, such as music or video, by complementing a media content item with an associated media content item.

This general object has been addressed by the appended independent claims. Advantageous embodiments are defined in the appended dependent claims.

In a first of its aspects, this disclosure concerns a method of operating an electronic device for performing playback of a streamed first media content item combined with a second media content item at a user interface of the electronic device. The method comprises performing playback of the first media content item, and during the playback of the first media content item, sending a first data message to a computer server system, the first data message comprising instructions to the computer server system to return information that a second media content item selectable, the second media content item being related to the first media content item. Furthermore, the method comprises, during the playback of the first media content item, receiving a second data message from the computer server system, the second data message comprising the information that the second media content item is selectable. In response to the second data message, it is displayed at the user interface as a visual array of tiles that the second media content item is selectable, wherein each one of the tiles corresponds to a respective second media content item according to the received information. Moreover, the method comprises receiving a first request for requesting playback of the second media content item and in response to the first request sending, to the computer server system, a third data message comprising instructions to return the second media content item, receiving a fourth data message from the computer server system, the fourth data message comprising the second media content item, and performing playback of the second media content item combined with the first media content item at the user interface.

Furthermore, performing playback of the second media content item combined with the first media content item may comprise playing the first media content item at a speaker of the user interface and displaying the second media content item at a display of the user interface, displaying both the first and the second media content items at the display, etc. Receiving the first request may comprise receiving a user input at a touch-sensitive surface of the user interface, e.g. in form of a swipe gesture, a tap gesture, a click gesture, etc. The second data message as well as the fourth data message may be received included in a media stream comprising the first media content item. The method may comprise determining one of the second media content items based on the user input, and adjust the order of the tiles such that the tile corresponding to the determined second media content item is displayed.

In a second of its aspects, this disclosure concerns a method of operating an electronic device for performing playback of a streamed first media content item and simultaneously delivering a service at the user interface. This method is similar to the method of the first aspect, but instead of a requesting a second media content item and performing combined playback, a selectable service is requested and delivered at the user interface. For instance, delivering the service may comprise any of: interacting with the user for playing a game, displaying a commercial offer, capturing a user input in a fill-in-form, and capturing an image with a camera of the electronic device and uploading the image to the computer server system.

In a third of its aspects, this disclosure concerns an electronic device. The electronic device comprises a user interface, and a processor. The electronic device further comprises a memory which stores computer program code, which, when run in the processor causes the electronic device to perform the method actions of the first aspect.

In a fourth of its aspects, this disclosure concerns an electronic device. The electronic device comprises a user interface, and a processor. The electronic device further comprises a memory which stores computer program code, which, when run in the processor causes the electronic device to perform the method actions of the second aspect.

In some embodiments, the electronic device is a stationary electronic device, such as a stationary computer. In alternative embodiments, a portable electronic device, such as a portable media presentation device, a mobile telephone, a cellular telephone, a tablet computer, a laptop computer, or a personal digital assistant.

In a fifth of its aspects, this disclosure concerns a computer program, comprising instructions which, when executed on at least one processor, cause the at least one processor to carry out the method according to the earlier-described first aspect. A carrier comprising the computer program may also be provided. The carrier may for example be one of an electronic signal, an optical signal, a radio signal, or a computer readable storage medium.

Various embodiments described herein may allow a user of an electronic device to select a second media content item which is associated with a currently playbacked media content item and perform simultaneous playback of the first media content item and the second media content item at the user interface. By displaying information about selectable associated media content items to a user, the user will be enabled to individually select associated media content items to complement a currently playbacked media content item. This may be perceived as flexible and convenient to the user, and improve his/her user experience. In addition, a provider of media content services may be enabled to allocate resources for delivery of the media content items according to the users' preferences, i.e. some users want to complement the playback with associated media content items while some users do not, and the provider may then allocate installed resources for streaming.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for delivery of streamed media content at a user interface of an electronic device may be inadequate. For example, existing solutions for playback of audio content may be perceived as limiting by some users. The inventors according to this disclosure have realized that users may want to request and complement the first media content with an associated second media content, e.g. complementing a song with lyrics, or complementing a video with sub-titles.

It is therefore a general object of embodiments described herein to allow for an improved playback of media content.

To address this, in accordance with an embodiment, described herein are an electronic device (e.g., a tablet computer or a smart phone) as well as a method of operating the electronic device for playback of media content played at a user interface of the electronic device. The example embodiments below disclose methods and arrangements by which a user may be enabled to request an electronic device to complement a played media content with another associated media content. In some of the embodiments, the user may request to complement, but also to stop complementing the first media content on his/her own volition.

Within this description, the term "media content" will be used to denote any type of media suitable for being playbacked on a speaker or a display of a user interface. For instance, media content may be realized in form of audio content, video contents, or image contents. "Media content items", are items of these media content forms. For instance, a media content item may be a song, a video, an image, a text, etc. Furthermore, a media content item may comprise more than one form of media content, e.g. a music video comprises typically both a video part to be displayed at a user interface, and a corresponding audio part to be played at a speaker of the user interface. It is also understood that a media content comprises a sequence of media content items.

For instance an electronic device which receives streamed a media content, receives a number of media content items in a stream from a media server.

Figure 1:
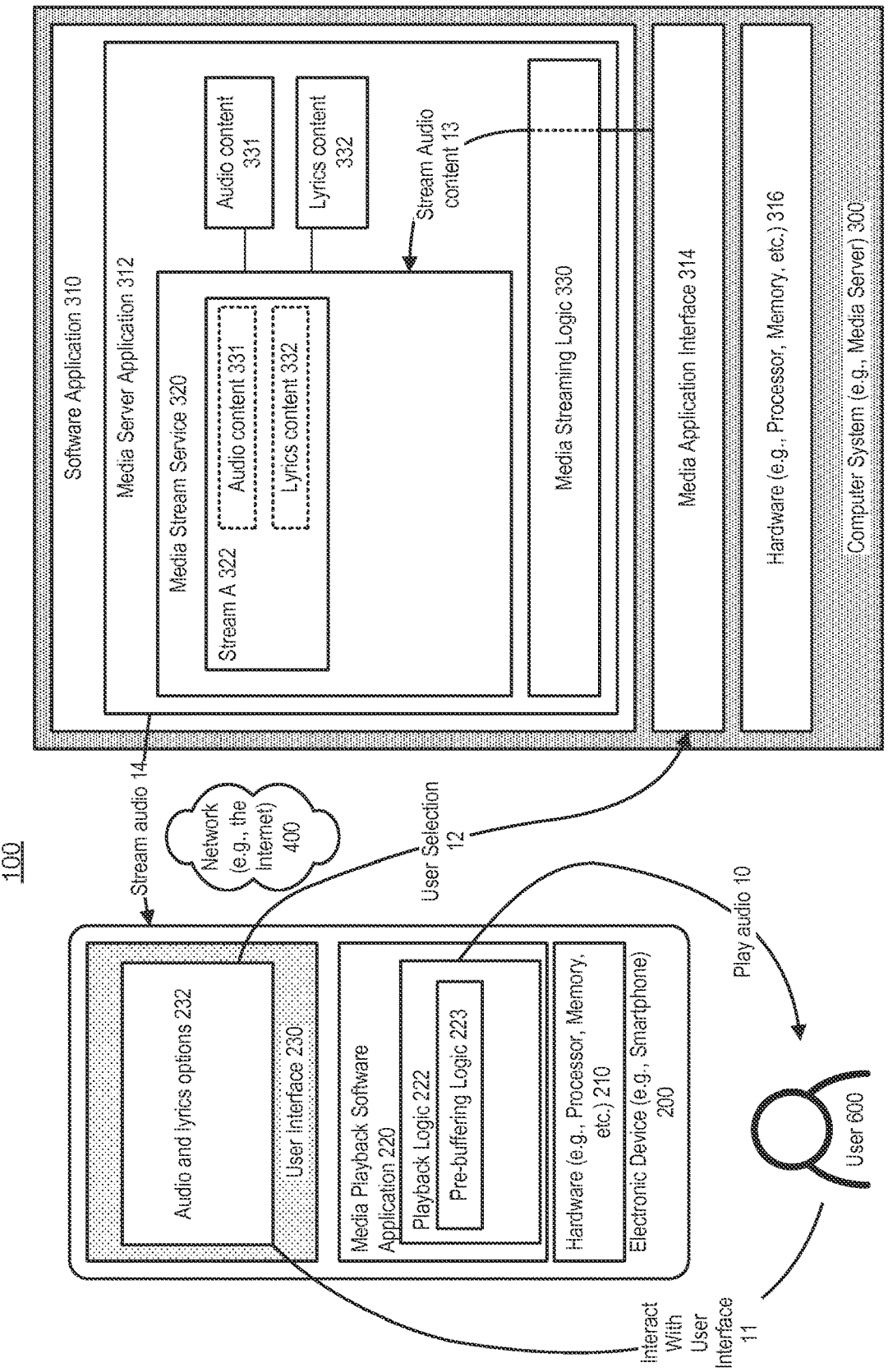
FIG. 1 illustrates a system for playback of audio content, in accordance with an embodiment.

Turning now to the figures, various embodiments of the invention will be described in further detail. FIG. 1 illustrates a system 100 for playback of media content, in accordance with an example embodiment. The system 100 may comprise an electronic device 200 and a computer system 300 operating as a media server. The electronic device 200 may be communicatively connectable to the computer system 300 via a network 400, such as the Internet, as is conventional and known in the existing art. As can be seen in FIG. 1, only a single electronic device 200 and a single computer system 300 are shown. However, the computer system 300 may support the simultaneous use of multiple electronic devices, and/or the electronic device 200 can simultaneously access video content at multiple computer systems.

In the following description, the media content will be exemplified to be audio content so as not to obscure the description of the embodiments disclosed herein with unnecessary detail. This should, however, not be interpreted as limiting the scope of the various embodiments of the invention.

As shown in FIG. 1, the electronic device 200 may be used for the playback of audio content complemented with lyrics content, which is provided by the computer system 300. The electronic device 200 may be a mobile telephone, such as a smart phone. Alternatively, the electronic device 200 may be a tablet computer. In yet other embodiments, the electronic device 200 may be any other electronic device capable of playback of audio content complemented with lyrics content, such as, for example, one of the electronic devices of the following group: a computer, a laptop computer, and a mobile electronic device (e.g. a handheld entertainment device, a digital media player, or other media device).

The electronic device 200 may include one or several physical computer resources, or hardware resources 210. Likewise, the computer system 300 operating as a media server may include one or several physical computer resources, or hardware resources 316.

The computer system 300 may include an operating system or other processing system which supports execution of a software application 310, including a media server application 312 which may be used, for example, to stream audio content complemented with lyrics content. A media stream service 320 may be used to buffer audio content 331 and lyrics content 332, for streaming to one or more complemented audio streams 322. A media application interface 314 may receive requests from electronic devices 200 or other systems, to retrieve complemented audio content from the computer system 300.

Audio content or items 331 and lyrics content or items 332 may be provided, for example, within a database or repository, or may be received by the computer system 300 from another source (not shown). This another source (not shown) may be external to the computer system 300, i.e. it may be located remotely from the computer system 300.

A media streaming logic 330 may be used to retrieve or otherwise access the audio content 331 and lyrics content 332 in response to requests from electronic devices 200 or other systems, and populate the complemented stream service with streams 322 of corresponding audio content 331 and lyrics content 332 that may be returned to the requesting electronic device 200.

In some embodiments, the electronic device 200 comprises a user interface 230. Typically, the user interface 230 includes a display 232, which is adapted to display lyrics information and a speaker (not shown) which is adapted to play the audio content. The display 232 is preferably, though not necessarily, a touch-sensitive display that is adapted to detect or otherwise determine a user input.

Selecting lyrics to be displayed at the display 232 may be used, or otherwise interpreted, as a request or instruction to the media server application 312 to stream or otherwise return associated lyrics to an audio content which is being played. For example, in accordance with some embodiments, the software application 310 at the computer system 300 may be used to stream or otherwise communicate audio content complemented with associated lyrics to the electronic device 200, wherein the display 232 of said user interface 230 at the electronic device 200 is adapted to display the selected lyrics when playing the audio content at the speaker of the electronic device 200.

A user 600 may interact 11 with the user interface 230 and issue requests, for example the playing a selected song (audio content) and displaying the associated lyrics (lyrics content or information) on the electronic device 200. The user's selection that lyrics is requested may be communicated 12 to the media server application 312, via the media application interface 314. The media server application 312 may then be instructed 13 to stream corresponding audio content, including one or more streams of audio content data 331 and lyrics content data 332, and subsequently stream 14 or otherwise communicate to the user's electronic device 200. In accordance with some embodiments, pre-buffering requests from the electronic device 200 may also be communicated to the media server application 312 via the media application interface 314. At the electronic device 200, in response to the user's interaction with the user interface 230, the media playback application 220, including the playback logic 222, may display 10 the requested lyrics content and play the associated audio content to the user 600, for example by playing back a song on the electronic device 200, as described in further detail below.

Figure 2:
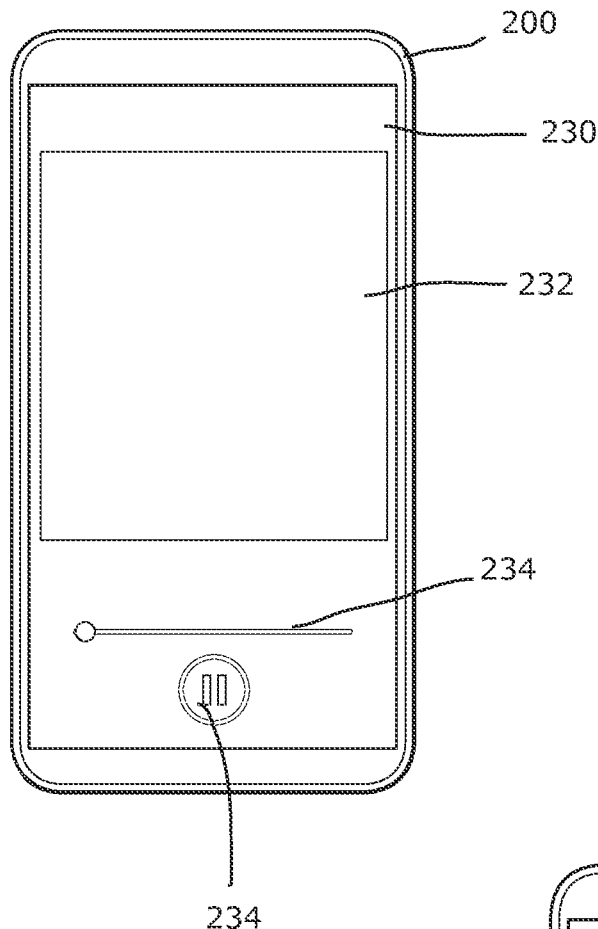
FIG. 2 illustrates a user interface of an electronic device.

FIG. 2 illustrates a smartphone 200, which is an example of an electronic device. The smartphone 200 comprises a user interface 230 which has a display 232 and user controls 234. In this example, the user controls 234 are arranged to control playback of streamed media content items at the user interface 230. In the figure the user controls 234 are illustrated as a pause control and a bar. The pause control will be shown during playback of a media content item, such that a user may pause the currently playbacked media content item by pressing or tapping the pause control. The bar will also be shown during the playback, such that the user may fast-forward the currently playbacked media content item by swiping the circle at the bar to an appropriate position.

The FIGS. 3A-3E illustrates five example views of a user interface 230 of an electronic device 200 in accordance with some exemplifying embodiments.

The electronic device 200 which comprises an improved user interface 230 compared with the above described example will be disclosed, and the same reference numbers will be used when appropriate. In these embodiments the electronic device 200 is implemented as a smartphone. However, the disclosed concept is not limited to smartphones and the electronic device may alternatively be implemented as any other suitable type of electronic device with a user interface and which is capable of performing playback of streamed media content items. For instance, the concept may also be applied on a tablet computer, a laptop computer, a desktop computer, a PDA (Personal Digital Assistant), etc.

Figure 3A:
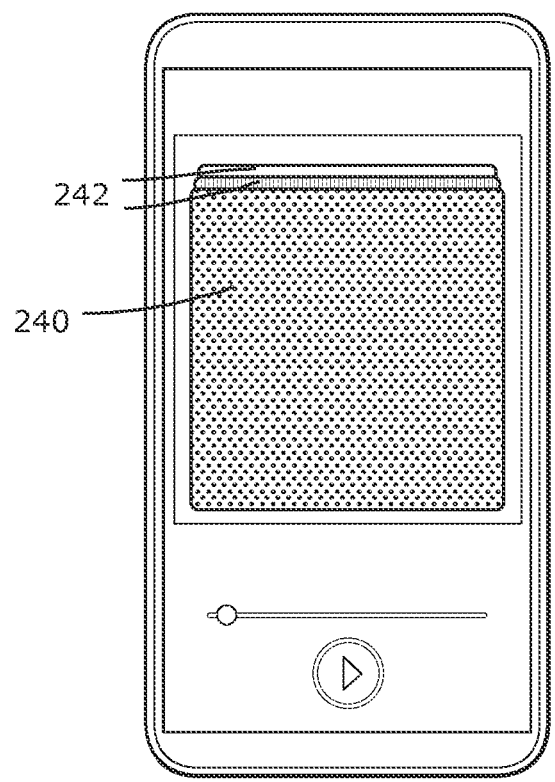
FIGS. 3A, 3B, 3C, 3D, 3E illustrate details of a user interface which support playback of audio content in accordance with some embodiments.

In FIG. 3A, a situation is illustrated where the smartphone 200 displays a plurality of tiles 240, 242 at a display of a user interface 230. In this embodiment, a graphic representation (not shown) of a currently playbacked media content item is displayed at a first tile 240. The currently playbacked media content item may be a song which is an audio item, and the shown graphic representation may then comprise an image, e.g. of an artist, or a music video associated with the song. Alternatively, the currently playbacked media content item may be a video item, and the graphic representation may be a still image or a low resolution version of a part of the music video. In the figure are also two further tiles 242 visible behind the tile 240. The tiles 240, 242, are displayed as a visual array of the tiles. The further tiles 242 indicates that media content items associated with the currently playbacked media content item are possible to request and complement the currently playbacked media content item with. Some examples of such associated media content items will be shown below in some other exemplifying embodiments.

Figure 3B:
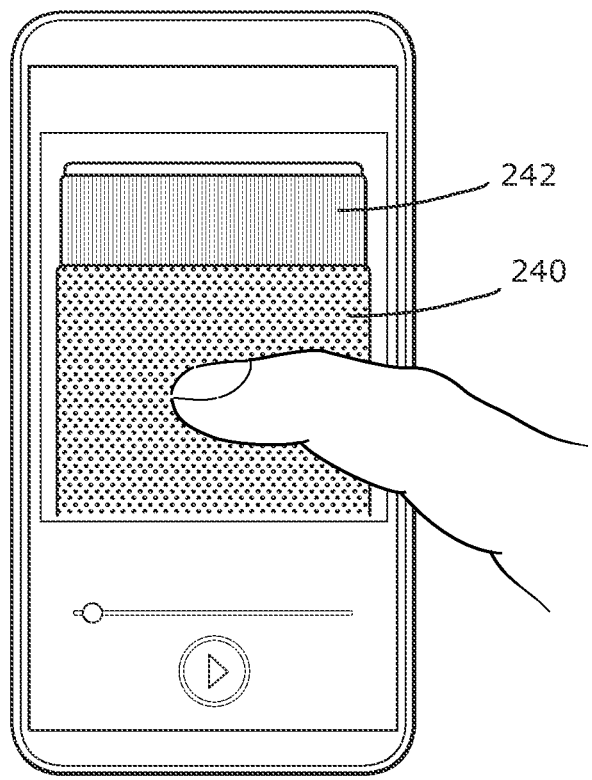

In FIG. 3B, a situation is illustrated where a user selects an associated media content item to the currently playbacked media content item. As seen in the figure, the user selects to request the associated media content item of a tile 242 which is decorated with a lined texture. The user performs a vertical swipe gesture with the finger and swipes the currently displayed tile 240 downwards in order display the tile 242 with the lined texture. In this embodiment, the currently playbacked media content item is a video item and the associated media content items are sub-titles of the video, and an interview with the director of the video, respectively.

In another example the currently playbacked media content item is a song which is played at a speaker of the user interface. The associated media content items may than be an image of an artist or of an album cover, a music video, lyrics, etc.

In the figure, the currently playbacked media content item is paused, which is indicated with a play symbol displayed at the user interface. Dependent on the types of the media content item, different ways of performing combined playback of a first and an associated second media content item are suitable. For instance, when displaying a video item and the requested associated media content item is sub-titles, it is suitable to perform the combined playback by continuing playing the video item while the sub-titles are displayed at an appropriate position of the user interface. When the associated media content item is an interview with the director, it is appropriate to pause the currently played video item while watching the interview. In another embodiment, below, a method performed by an electronic device will be disclosed more detailed.

Figure 3C:
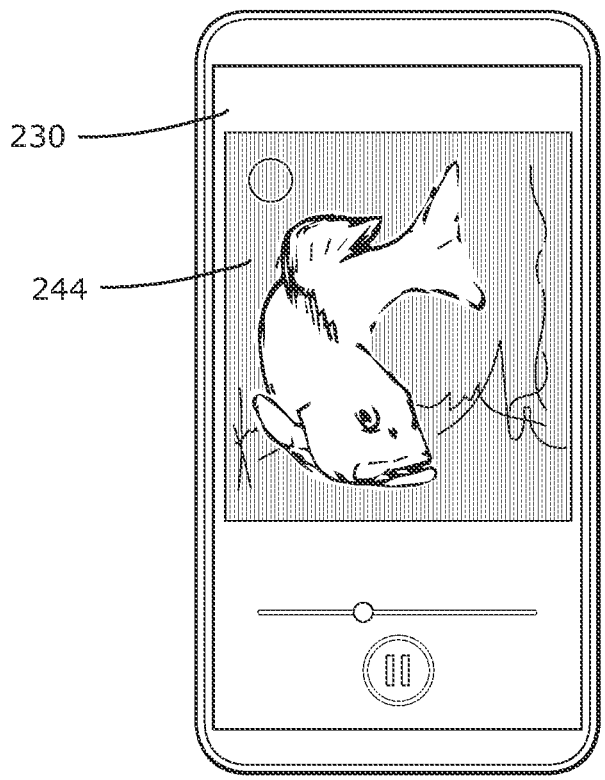

In FIG. 3C, a situation where a user has selected an associated media content item and activated the associated media content item at the user interface, is illustrated. In this embodiment the user has selected the associated media content item by swiping a tile of the currently playbacked media content item downwards such that a tile of the associated media content item was displayed at the user interface. Thereafter the user has performed a tap gesture at the user interface to request the associated media content item. In the figure the displayed associated media content item is a music video 244 which is associated with a currently played song. As seen the tiles are no longer present when the music video is displayed in order to emphasize the effect of the music video.

By designing the user interface such that the associated media content first could be selected by a first user input, and then be requested by a second user input, the electronic device will be enabled to display simplified representations of the associated media content items without requesting the complete associated media content items. The user may thereby effectively and with a limited amount of data transmitted to the electronic device, get a perception of the associated media content items before requesting one of them.

For instance, it the user plays a song at the user interface, and one of the associated media content items is a music video, the electronic device may display a low resolution image of the music video at the tile. Instead of starting to display the music video when the tile is displayed, the electronic device does not request the music video before it is requested by the user. Thereby the user will be enabled to preview and select between representations of associated media content items before requesting the selected one. The user may then limit the amount of transmitted data, which may be effective and economic, e.g. in situations where data transmission capacity is limited or expensive.

Figure 3D:
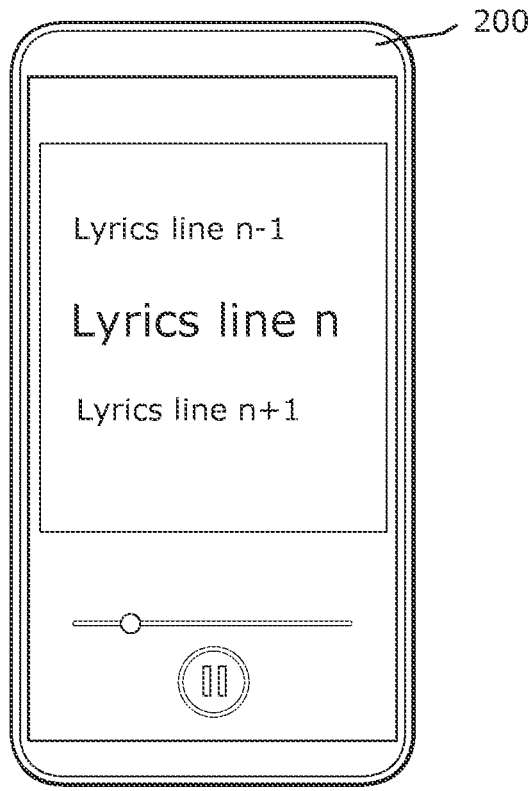

In the FIG. 3D, another situation where a user has selected an associated media content item and activated the associated media content item at the user interface, is illustrated. This situation is similar to the situation of the FIG. 3C, but differs in that the associated media content instead is the accompanying lyrics of the song. The currently sung verse is indicated as "Lyrics line n" in the figure. The previously sung verse and the upcoming verse may be shown too, which is indicated as the less emphasized "Lyrics line n−1" and "Lyrics line n+1". These lyrics lines may for instance be displayed shaded or with a less visible color in order to be visible for the user without disturbing the appearance of the current lyrics line.

Figure 3E:
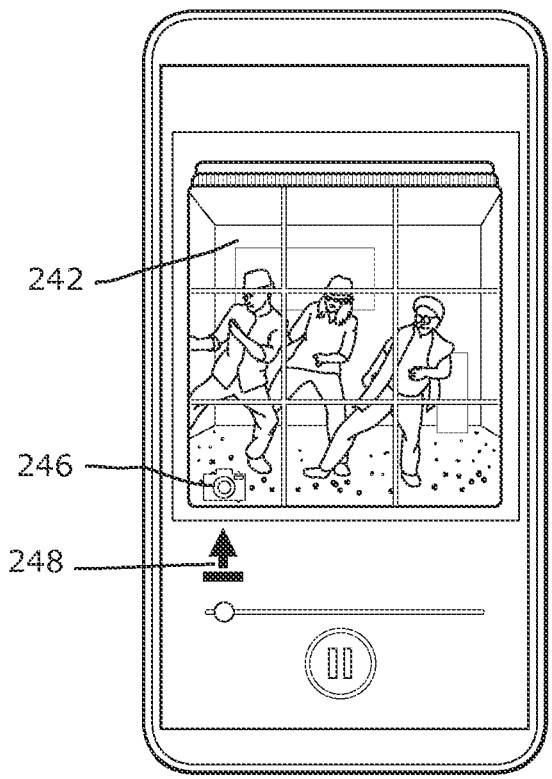

In the FIG. 3E, a situation where a user has selected an associated service, is illustrated. The service is associated to a currently playbacked media content item. The situation is similar to the situations of some above described situations, but instead of requesting an associated media content item, an associated service is requested and delivered.

The service is indicated at the selected tile 242, and enables a user to capture an image of a scene with a camera of the electronic device and upload the image to a computer server system. The user interface comprises a user control 246 by which the user activates the camera by performing a tap gesture, and another user control 248 by which the user requests upload of the captured image. The uploaded image may then be requested by other users from the computer server system, as will be described below in another exemplifying embodiment.

Figure 4A:
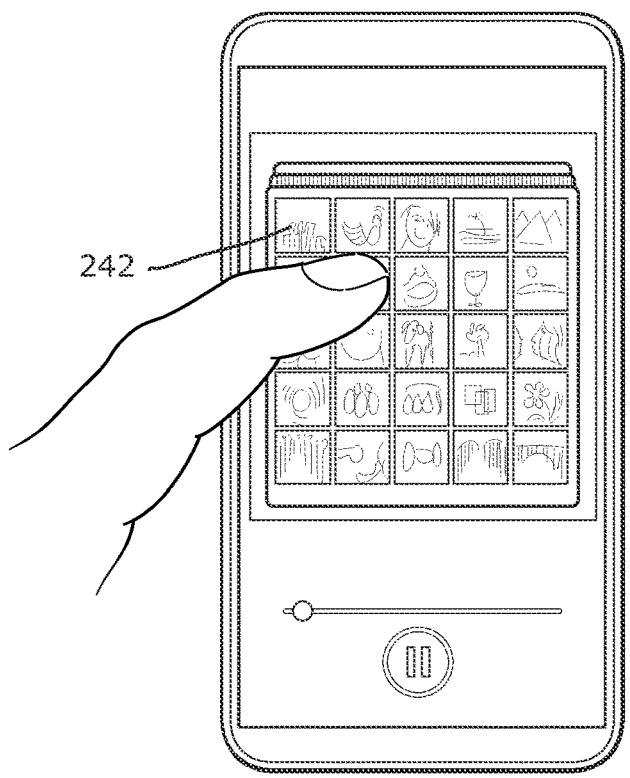
FIGS. 4A, 4B illustrate details of a user interface which support playback of audio content in accordance with some embodiments.
Figure 4B:
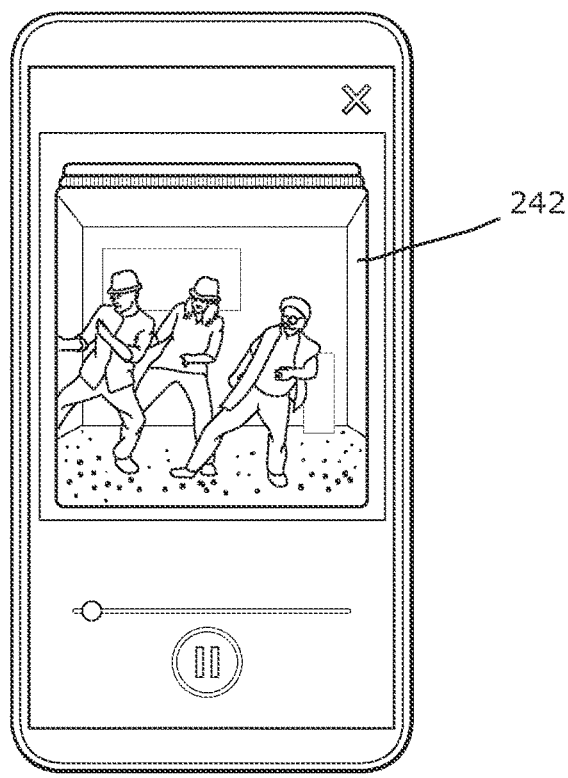

The FIGS. 4A-4B, which are schematic overviews, illustrate situations where a user selects and requests a media content item which has been uploaded by another user. In the FIG. 4A, a tile 242 indicates that a service for requesting images captured by other users is able to request. The tile 242 has been selected by a first user and graphic representations of requestable images which another second user has considered to be associated with a currently playbacked media content item are displayed at the tile 242. The second user selects one of the images by performing a user input at the graphic representation of the image. In the figure, the first user performs the user input as a tap gesture. However, other the user interface may be implemented to receive the user input as other alternative gestures instead, e.g. a click gesture, a press gesture, a swipe gesture, etc.

The FIG. 4B illustrates an alternative design of a tile 242. In this embodiment, one image per tile is shown instead of a plurality of images, as in the FIG. 4A.

Example Methods

With reference to the FIGS. 5 and 5A, which are schematic flow charts, methods according to exemplifying embodiments herein will now be described.

Figure 5:
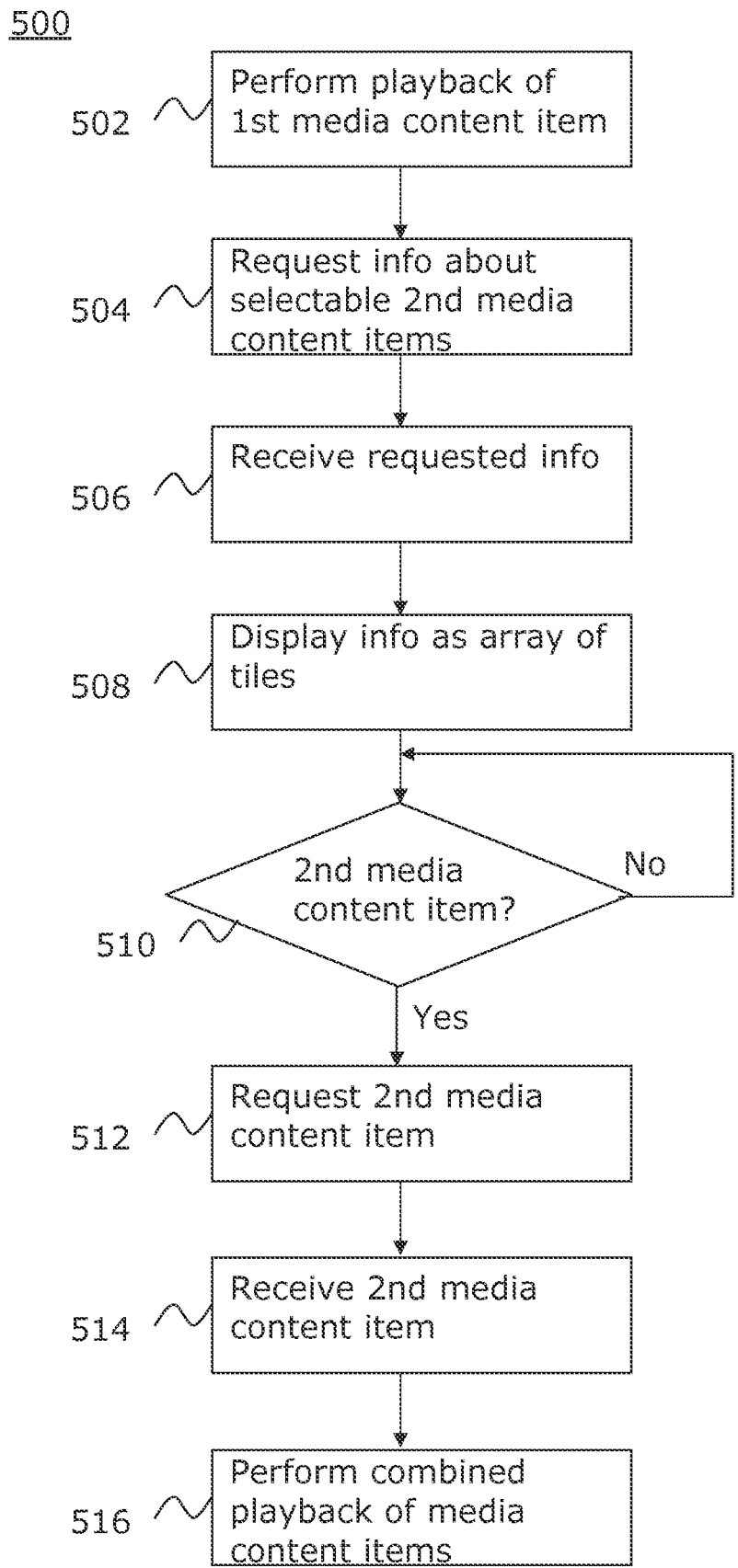
FIGS. 5, 5A illustrate flowcharts of methods according to some embodiment.

FIG. 5 illustrates an example method 500 of operating an electronic device for performing playback of a first media content item combined with a second media content item at a user interface of the electronic device.

In a first action 502, playback of a first media content item is performed. For instance, a song, which is an audio item, is played by a speaker of the user interface, or a video item is displayed at a display of the user interface.

During the playback, in another action 504, the electronic device sends a first data message to a computer server system. The first data message comprises instructions to the computer server system to return information that one or more second media content items are selectable. The second media content items are associated with the first media content item.

In a subsequent action 506, the information is received comprised in a second data message from the computer server system. This second data message may be included in a media stream comprising the first media content item, but may alternatively be sent separately by the computer server system instead.

In a following action 508, the electronic device displays that the second media content items are selectable at the user interface as a visual array of tiles. Each one of the tiles corresponds to a respective second media content item according to the received information of action 506. It is to be noted that the design of the tiles and the array may be implemented alternatively within the concept and is not limited to the design of the figures. For instance, the visual array of tiles may be designed as a set of tabs, a grid of icons, or any other suitable representation of the associated second media content items.

In another action 510, the electronic device receives a first request for requesting playback of the second media content item. In this embodiment, the request is received as a tap gesture on a representation of the second media content at the user interface. The electronic device may continuously monitor if a request is received, which is indicated in the figure.

In response to the received request, in an action 512, the electronic device sends a third data message to the computer server system. This third data message comprises instructions to return the requested second media content item, i.e. the electronic device requests the requested media content item from the computer server system.

In a following action 514, a fourth data message is received from the computer server system. This fourth data message comprises the requested second media content item, and may be received within a media stream which comprises the first media content item.

In a final action 516, the electronic device performs then combined playback of the first and the second media content items at the user interface. As described above, the combined playback may be performed by pausing the first media content item when playbacking the second media content item, playing one of the media content items at a speaker and simultaneously displaying the other media content item at a display, etc.

Figure 5A:
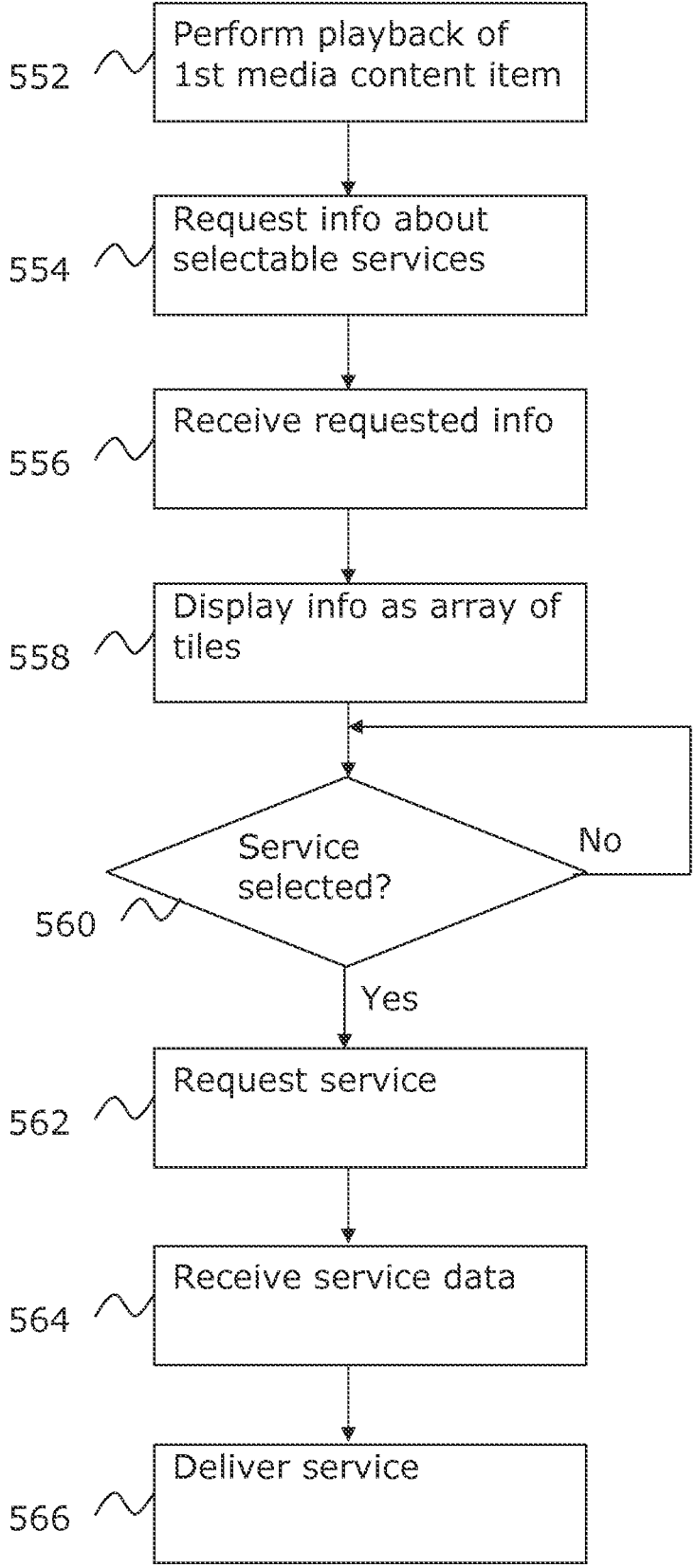

FIG. 5A illustrates an example method 550 of operating an electronic device for performing playback of a first media content item and simultaneously delivering a service at a user interface of the electronic device. This method is similar to the method described in conjunction with FIG. 5 but instead of enabling a user to request an associated media content item, it enables the user to request an associated service.

In a first action 552, playback of a first media content item is performed. For instance, a song, which is an audio item, is played by a speaker of the user interface, or a video item is displayed at a display of the user interface.

During the playback, in another action 554, the electronic device sends a first data message to a computer server system. The first data message comprises instructions to the computer server system to return information that one or more services are selectable. The services are associated with the first media content item. For instance, such associated services may be: a service for capturing and uploading images of photos to a media server, a service for presenting commercial information or offers, a service for capturing user information, etc.

In a subsequent action 556, the information is received comprised in a second data message from the computer server system. This second data message may be included in a media stream comprising the first media content item, but may alternatively be sent separately by the computer server system instead.

In a following action 558, the electronic device displays that the services are selectable at the user interface as a visual array of tiles. Each one of the tiles corresponds to a respective service according to the received information of action 556. Similarly, as described above, the tiles and the array may be designed different within the disclosed concept.

In another action 560, the electronic device receives a first request for requesting delivery of the service. In this embodiment, the request is received as a tap gesture on a representation of the second media content at the user interface. The electronic device may continuously monitor if a request is received, which is indicated in the figure.

In response to the received request, in an action 562, the electronic device sends a third data message to the computer server system. This third data message comprises instructions to return service data of the requested service.

In a following action 564, a fourth data message is received from the computer server system. This fourth data message comprises the requested service data, and may be received within a media stream which comprises the first media content item.

In a final action 566, the electronic device delivers then the service simultaneously as performing the playback of the first media content item. The electronic delivers the service by utilizing the received service data, e.g. by processing the service data into instructions which are executed by one or more processors of the electronic device.

It should be appreciated that the examples described hereinabove are non-limiting and those skilled in the art would understand that modifications and variations are possible within the disclosed concept. For instance, in a similar exemplifying embodiment as the above described one, the information that a second media content is available for selection is instead obtained before the starting the playback of the first media content.

It is to be noted that even if the above described embodiments have been described for audio content which is complemented with textual content or image content, the inventive concept is not limited thereto. A designer may apply the described concept also for other suitable types of media contents when appropriate. For instance, the designer may devise a method for complementing video content with associated textual content or image content, such as complementing a film with sub-titles or commercial information. In addition, the textual content of the above described embodiments may alternatively be implemented as images when appropriate. For instance, one or more lyrics lines may be sent as images.

Example Computer-Readable Mediums

Figure 6:
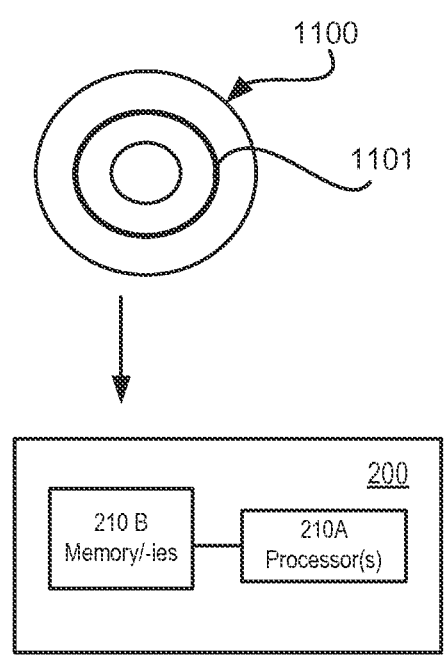
FIG. 6 illustrates an example of a computer program product according to an embodiment.

Turning now to FIG. 6, another embodiment will be briefly discussed. FIG. 6 shows an example of a computer-readable medium, in this example in the form of a data disc 1100. In one embodiment the data disc 1100 is a magnetic data storage disc. The data disc 1100 is configured to carry instructions 1101 that when loaded into a memory 210B for execution by a processor 210A of an electronic device 200, executes a method or procedure according to the embodiments disclosed in this disclosure. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium can also be other mediums such as compact discs, digital video discs, flash memories or other memory technologies commonly used. In such an embodiment the data disc 1100 is one type of a tangible computer-readable medium. The instructions may alternatively be downloaded to a computer data reading device, such as a computer or other electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice.

Furthermore, it should be appreciated that embodiments described in this disclosure could be advantageously combined with any one of the embodiments described in the co-filed U.S. patent application Ser. No. 14/749,518, filed on Jun. 24, 2015, entitled "A METHOD AND AN ELECTRONIC DEVICE FOR PERFORMING PLAYBACK AND SHARING OF STREAMED MEDIA", inventors Frank Conway et al, which is herein incorporated by reference in its entirety.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method of operating an electronic device for performing playback of a streamed first media content item combined with a second media content item at a user interface of the electronic device, the method comprising:

during playback of the first media content item,
sending a first data message to a computer server system, the first data message comprising instructions to the computer server system to return an indication that one or more additional media content items associated with the first media content item are selectable, and receiving a second data message from the computer server system, the second data message comprising the indication that the one or more additional media content items are selectable, displaying, at the user interface, a plurality of tiles in a visual array, including a first tile associated with the currently played first media content item and one or more additional tiles visible behind the first tile, wherein the one or more additional tiles are associated with the one or more additional media content items and provide the indication that the one or more additional media content items are selectable, receiving, at the user interface, a first input at the first tile associated with the currently played first media content item, within the visual array, to cause display of one of the additional tiles visible behind the first tile, at the user interface, wherein the first input is interpreted as indicative of a selection of the one of the additional tiles visible behind the first tile, and wherein the selected additional tile is associated with a second media content item from within the one or more additional media content items, receiving, at the user interface, a second input indicative of a request to receive the selected second media content item for playback, in response to receiving the second input, sending, to the computer server system, a third data message comprising instructions to return the selected second media content item, receiving a fourth data message from the computer server system, the fourth data message comprising the selected second media content item, and performing playback of the selected second media content item combined with the first media content item at the user interface, including determining a first media type of the first media content item and a second media type of the selected second media content item, and based on the determined first media type and the determined second media type, controlling playback of the first media content item and the selected second media content item, including by continuing playback of the first media content item at one or more of a speaker or a display of the user interface, when performing playback of the selected second media content item.

2. The method of claim 1, wherein performing playback of the selected second media content item comprises at least one of:

playing the first media content item by a speaker of the user interface, and displaying the selected second media content item at a display of the user interface, and displaying the first media content item at the display of the user interface, and displaying the selected second media content item at the display of the user interface.

3. The method of claim 1, wherein receiving the fourth data message comprises receiving the selected second media content item included in a media stream comprising the first media content item.

4. The method of claim 1, wherein the user interface comprises a touch-sensitive surface adapted to receive the first input and the second input, and wherein at least one of the first input and the second input comprises one or more of: a swipe gesture, a tap gesture, and a click gesture.

5. The method of claim 4, wherein the one or more additional media content items comprises a plurality of additional media content items, and the method further comprises determining one of the plurality of additional media content items based on the first input.

6. The method of claim 5, further comprising adjusting a displayed ordering of the plurality of additional media content items, such that the determined one of the plurality of additional media content items is displayed at the display.

7. The method of claim 1, wherein the first media content item is a song, and the selected second media content item comprises one of: lyrics, a music video, an image, a list comprising other recommended songs, an interview, information regarding an artist or information regarding the song, and a commercial offer.

8. The method of claim 1, wherein the first media content item is a video, and the selected second media content item comprises one of: sub-titles, a song, an image, a list comprising recommended songs or videos, an interview, information regarding an artist or information regarding the video, and a commercial offer.

9. The method of claim 1, wherein a playback control is displayed at the user interface during playback of at least one of the first media content item or the selected second media content item.

10. A method of operating an electronic device for performing playback of a streamed first media content item at a user interface of the electronic device, and simultaneously delivering a service at the user interface, the method comprising:

during playback of the first media content item, sending a first data message to a computer server system, the first data message comprising instructions to the computer server system to return an indication that one or more associated services associated with the first media content item are selectable, and receiving a second data message from the computer server system, the second data message comprising the indication that the one or more associated services are selectable, displaying, at the user interface, a plurality of tiles in a visual array, including a first tile associated with the currently played first media content item and one or more additional tiles visible behind the first tile, wherein the one or more additional tiles are associated with the one or more associated services and provide the indication that the one or more associated services are selectable, receiving, at the user interface, a first input at the first tile associated with the currently played first media content item, within the visual array, to cause display of one of the additional tiles visible behind the first tile, at the user interface, wherein the first input is interpreted as indicative of a selection of the one of the additional tiles visible behind the first tile, and wherein the selected additional tile is associated with a service from within the one or more associated services, receiving, at the user interface, a second input indicative of a request to receive the selected service, in response to receiving the second input, sending, to the computer server system, a request for service data of the selected service, receiving, from the computer server system, the service data of the selected service in response to the request, and delivering the selected service, by utilizing the received service data, combined with performing playback of the first media content item at the user interface, including determining a media type of the first media content item and a service type of the selected service, and based on the determined media type and the determined service type, controlling playback of the first media content item and delivery of the selected service, including by continuing playback of the first media content item at one or more of a speaker or a display of the user interface, when delivering the selected service.

11. The method of claim 10, wherein delivering the selected service comprises at least one of:
playing a game at the user interface,
displaying a commercial offer at the user interface,
displaying a fill-in-form, capturing a user input in the fill-in-form, and sending the user input to a service provider, and
capturing an image with a camera of the electronic device, and uploading the image to the computer server system.

12. An electronic device for performing playback of a streamed first media content item combined with a second media content item at a user interface of the electronic device, the electronic device comprising:
a user interface;
a processor; and
a memory storing computer program code, which, when run in the processor causes the electronic device to:
during playback of the first media content item,
send a first data message to a computer server system, the first data message comprising instructions to the computer server system to return an indication that one or more additional media content items associated with the first media content item are selectable, and
receive a second data message from the computer server system, the second data message comprising the indication that the one or more additional media content items are selectable,
display, at the user interface, a plurality of tiles in a visual array, including a first tile associated with the currently played first media content item and one or more additional tiles visible behind the first tile,
wherein the one or more additional tiles are associated with the one or more additional media content items and provide the indication that the one or more additional media content items are selectable,
receive, at the user interface, a first input at the first tile associated with the currently played first media content item, within the visual array, to cause display of one of the additional tiles visible behind the first tile, at the user interface, wherein the first input is interpreted as indicative of a selection of the one of the additional tiles visible behind the first tile, and wherein the selected additional tile is associated with a second media content item from within the one or more additional media content items,
receive, at the user interface, a second input indicative of a request to receive of the selected second media content item for playback,
in response to receiving the second input, send, to the computer server system, a third data message comprising instructions to return the selected second media content item,
receive a fourth data message from the computer server system, the fourth data message comprising the selected second media content item, and
perform playback of the selected second media content item combined with the first media content item at the user interface, including
determining a first media type of the first media content item and a second media type of the selected second media content item, and
based on the determined first media type and the determined second media type, controlling playback of the first media content item and the selected second media content item, including by continuing playback of the first media content item at one or more of a speaker or a display of the user interface, when performing playback of the selected second media content item.

13. The electronic device of claim 12, wherein the memory stores computer program code, which, when run in the processor causes the electronic device to perform playback of the selected second media content item by performing at least one of:
playing the first media content item by a speaker of the user interface, and displaying the selected second media content item at a display of the user interface, and
displaying the first media content item at the display of the user interface, and displaying the selected second media content item at the display of the user interface.

14. The electronic device of claim 12, wherein the memory stores computer program code, which, when run in the processor causes the electronic device to receive the fourth data message by receiving the selected second media content item included in a media stream comprising the first media content item.

15. The electronic device of claim 12, further comprising a touch-sensitive surface adapted to receive the first input and the second input, and wherein at least one of the first input and the second input comprises one or more of: a swipe gesture, a tap gesture, and a click gesture.

16. The electronic device of claim 15, wherein the one or more additional media content items comprises a plurality of additional media content items, and the memory stores computer program code, which, when run in the processor causes the electronic device to determine one of the plurality of additional media content items based on the first input.

17. The electronic device of claim 16, wherein the memory stores computer program code, which, when run in the processor causes the electronic device to adjust a displayed ordering of the plurality of additional media content items, such that the determined one of the plurality of additional media content items is displayed at the display.

18. The electronic device of claim 12, wherein a playback control is displayed at the user interface during playback of at least one of the first media content item or the selected second media content item.

19. An electronic device for playback of a streamed first media content item at a user interface of the electronic device, and simultaneously delivering a service at the user interface, the first electronic device comprising:
a user interface;
a processor; and
a memory storing computer program code, which, when run in the processor causes the first electronic device to:
during playback of the first media content item,
send a first data message to a computer server system, the first data message comprising instructions to the computer server system to return an indication that one or more associated services associated with the first media content item are selectable, and
receive a second data message from the computer server system, the second data message comprising the indication that the one or more associated services are selectable, and in response thereto
display, at the user interface, a plurality of tiles in a visual array, including a first tile associated with the currently played first media content item and one or more additional tiles visible behind the first tile, wherein the one or more additional tiles are associated with the one or more associated services and provide the indication that the one or more associated services are selectable, receive, at the user interface, a first input at the first tile associated with the currently played first media content item, within the visual array, to cause display of one of the additional tiles visible behind the first tile, at the user interface, wherein the first input is interpreted as indicative of a selection of the one of the additional tiles visible behind the first tile, and wherein the selected additional tile is associated with a service from within the one or more associated services, receive, at the user interface, a second input indicative of a request to receive the selected service, in response to receiving the second input, send, to the computer server system, a request for service data of the selected service, receive, from the computer server system, the service data of the selected service in response to the request, and deliver the selected service, by utilizing the received service data, combined with performing playback of the first media content item at the user interface, including determining a media type of the first media content item and a service type of the selected service, and based on the determined media type and the determined service type, controlling playback of the first media content item and delivery of the selected service, including by continuing playback of the first media content item at one or more of a speaker or a display of the user interface, when delivering the selected service.

20. The electronic device of claim 19, wherein the memory stores computer program code, which, when run in the processor causes the electronic device to deliver the selected service by performing at least one of:

playing a game at the user interface, displaying a commercial offer at the user interface, displaying a fill-in-form, capturing a user input, and send the user input to a service provider, and capturing an image with a camera of the electronic device, and uploading the image to the computer server system.

21. A non-transitory computer readable storage medium storing one or more programs, the one or more programs comprising instructions, which, when executed by an electronic device with one or more processors, cause the electronic device to perform the method of during playback of the first media content item, sending a first data message to a computer server system, the first data message comprising instructions to the computer server system to return an indication that one or more additional media content items associated with the first media content item are selectable, and receiving a second data message from the computer server system, the second data message comprising the indication that the one or more additional media content items are selectable, displaying, at a user interface of the electronic device, a plurality of tiles in a visual array, including a first tile associated with the currently played first media content item and one or more additional tiles visible behind the first tile, wherein the one or more additional tiles are associated with the one or more additional media content items and provide the indication that the one or more additional media content items are selectable, receiving, at the user interface, a first input at the first tile associated with the currently played first media content item, within the visual array, to cause display of one of the additional tiles visible behind the first tile, at the user interface, wherein the first input is interpreted as indicative of a selection of the one of the additional tiles visible behind the first tile, and wherein the selected additional tile is associated with a second media content item from within the one or more additional media content items, receiving, at the user interface, a second input indicative of a request to receive the selected second media content item for playback, in response to receiving the second input, sending, to the computer server system, a third data message comprising instructions to return the selected second media content item, receiving a fourth data message from the computer server system, the fourth data message comprising the selected second media content item, and performing playback of the selected second media content item combined with the first media content item at the user interface, including determining a first media type of the first media content item and a second media type of the selected second media content item, and based on the determined first media type and the determined second media type, controlling playback of the first media content item and playback of the selected second media content item, including by continuing playback of the first media content item at one or more of a speaker or a display of the user interface, when performing playback of the selected second media content item.

* * * * *